April 30, 1963 E. M. KERWIN, JR 3,087,571
APPARATUS FOR DAMPING

Filed May 5, 1959 5 Sheets-Sheet 1

INVENTOR.
EDWARD M. KERWIN JR
BY Rines and Rines
ATTORNEYS

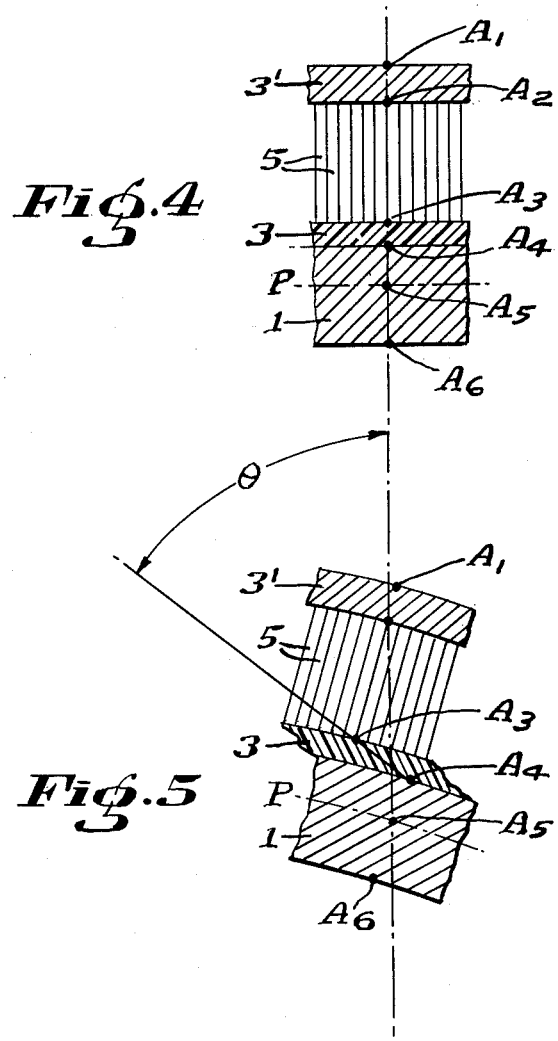

April 30, 1963 E. M. KERWIN, JR 3,087,571
APPARATUS FOR DAMPING

Filed May 5, 1959 5 Sheets-Sheet 4

INVENTOR.
EDWARD M. KERWIN JR.
BY Rines and Rines
ATTORNEYS

INVENTOR.
EDWARD M. KERWIN, JR.

BY Rines and Rines

ATTORNEYS

United States Patent Office 3,087,571
Patented Apr. 30, 1963

3,087,571
APPARATUS FOR DAMPING
Edward M. Kerwin, Jr., Weston, Mass., assignor to Bolt Beranek and Newman Inc., Cambridge, Mass., a corporation of Massachusetts
Filed May 5, 1959, Ser. No. 811,191
10 Claims. (Cl. 181—33)

The present invention relates to apparatus for damping, being more particularly related to the damping of flexural movements of a surface, and constituting a continuation-in-part of co-pending application of Edward M. Kerwin, Jr., Serial No. 654,476, filed April 23, 1957, for Method Of And Apparatus For Damping.

As is explained in the said co-pending application, many proposals have been offered for damping the vibration of flexural surfaces such as, for example, the metallic or other surfaces, panels or housings of vibration- or noise-producing equipment, or of the bodies or other parts of vehicles, such as automotive, railroad and aircraft vehicles and the like. It has been the object of these proposals to eliminate the disturbing or otherwise undesirable effects of the transmission of such vibrations or noise through the flexural surfaces. In addition, the fatiguing of metal and other parts can be prevented by limiting flexural movements or vibrations of the same. If the surfaces can be thus effectively damped, of course, these ends can be achieved.

As is further explained in the said copending application, it has been proposed to coat the surfaces with layers of damping material in order to inhibit the vibration thereof. Unfortunately, however, the thickness of damping layers that is required to produce effective results adds highly undesirable mass or weight, which may be particularly vital factors, for example, in connection with airborne apparatus and the like. In addition, it is difficult to provide a uniform degree of hardening or curing throughout all parts of a thick applied damping layer, and hence the desired uniform properties throughout the layer are difficult to achieve. Other proposals have involved the inhibiting or suppressing of the vibratory motion of, for example, a thin panel or the like, by stiffening the same with the aid of a further panel that is flexible in contraction but non-extensible or non-yielding in expansion. Such proposals, however, have been found to be quite limited in practice since the non-yielding properties of the added panel actually prevent the dissipation of mechanical vibrational energy. Still another suggested solution to this problem, accordingly, has involved covering the flexural surface with a sheet of waffle-like dampening material that is secured to or intimately covers the surface only at spaced intervals; and, in some cases to stiffen the damping material with a stiff felt or a thin sheet metal panel and the like. As another illustration, damping tapes have also been applied in one or more layers for similar purposes; but again, these proposals are relatively inefficient and are subject to the disadvantages before discussed.

It is therefore explained, in the said co-pending application, that improved operation can be achieved by spacing a damping layer from the surface-to-be-damped that is subjected to the flexural vibration, the space containing mechanical coupling means for coupling the damping layer or layers to the surface-to-be-damped. One embodiment disclosed in the said co-pending application, involves spacing damping tapes from the surface to be damped, and it is with this particular modification, and improvements thereupon, that the present invention is primarily concerned. The term "damping tape," as employed herein, is intended to connote any constrained visco-elastic or otherwise lossy layer together with a constraining layer.

An object of the present invention, accordingly, is to provide a new and improved damping apparatus.

A further object is to provide new and improved structures that are adapted for application to surfaces to be damped.

An additional object is to provide a new and improved damping structure embodying as an element thereof damping tapes and the like.

Other and further objects will be explained hereinafter and will be more particularly pointed out in the appended claims.

The invention will now be described in connection with the accompanying drawing, FIG. 1 of which is a fragmentary longitudinal section of the damping-tape modification described in the said co-pending application and constructed in accordance with a preferred embodiment of the present invention;

FIGS. 4 and 5 are views respectively similar to FIGS. 1 and 2, with the arrangement of parts reversed;

Figure 1:
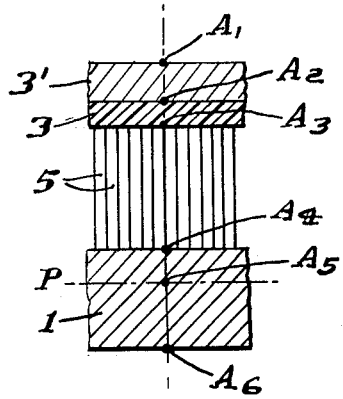

In FIGURE 1, the surface 1 represents, for example, a bounding surface of a machinery housing, or a sheet, panel or other surface of a vehicle body, or any other surface that may be subjected to flexural movements and that is to be damped. Associated with the surface 1 is a damping layer 3 of complex shear modulus that, in FIG. 1, as explained in the said co-pending application, is mechanically coupled to the surface 1, as later described, so that it is caused to flex therewith. Suitable materials include the filled high polymer plastic compounds, described by Oberst et al. in Akutiche Beihefte (1954), Heft 1, AB 437–448, presently marketed under trademarks "Aquaplas" and "Schallschluck." The term "layer," as used in the specification and in the claims, is intended to connote not only a single slab of material but, also, multiple slabs or composite damping-material structures, as also later more fully explained. A lightweight spacer means 5 holds the relatively thin layer 3 spaced from but mechanically coupled to the surface 1. The said co-pending application explains that the spacer medium 5 may, as an illustration, comprise light-weight metal, cardboard or other honeycomb-type structures or the like having spaced cells, as shown at 5, that serve as supports to hold the layer 3 spaced from the surface 1; the spacer 5 adhering to the surface 1 by means of cement or the like and, by similar adhesion to the layer 3, such that there results a stiff mechanical coupling between surface 1 and the layer 3. In some cases, the spacer means 5 may contain damping lossy material. Other kinds of struts or similar supports 5 may also be employed, including solid, molded materials, rigid foamed styrene ("Styrofoam"), polyurethane, or other foam-like plastics, expanded metals, ceramics and the like. Spacer projections may also emanate from the surface 1 itself, all as set forth in the said co-pending application. Corrugated spacer structures can also be employed. In all cases, the spacer 5 has a shear stiffness, of course, that is much greater than that of the damping layer 3. The shear stiffness is determined by the ratio of the shear modulus to the thickness of the spacer. It has been found that both the total shear stiffness and the loss factor in shear of the combination of the damping layer or layers 3 and the spacer means 5 remains substantially equal to that of the damping layer or layers 3 alone, provided the shear stiffness of the spacer 5 is at least ten times the shear stiffness of the damping layer or layers 3.

The use of the damping tape described in the said co-pending application, moreover, involves shear-constraining or stiffening of the damping layer 3 by a metal, foil or similar member 3', as is well known. The spacer member 5, however, should have an extensional stiffness, determined by the product of its Young's modulus times its thickness, less than that of each of the constraining layer 3' and the surface 1 to be damped, and the magnitude of the damping layer shear modulus must be less than that of each of the said surface 1 and constraining layer 3'.

Figure 2:
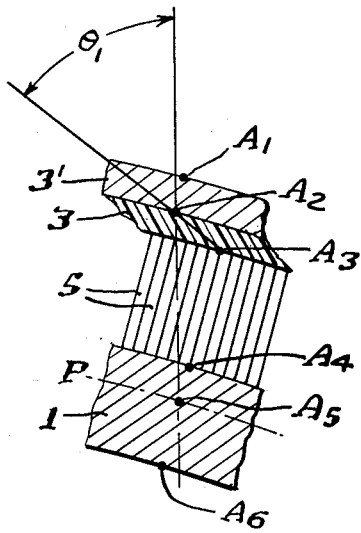
FIG. 2 is a view similar to FIG. 1 illustrating the apparatus of FIG. 1 subjected to flexure, as in vibration.
Figure 3:
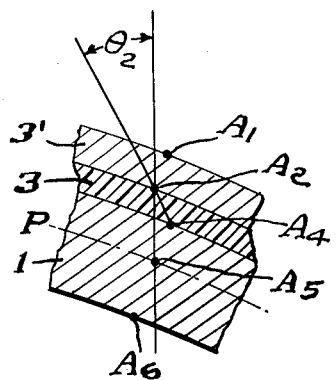
FIG. 3 is a view similar to FIG. 2 of prior-art apparatus employing damping tape and the like applied directly to the surface to be damped.

With such a construction, it has been found that, whereas the prior-art use of damping-tape structures 3—3' upon the surface-to-be-damped 1, FIG. 3, causes a predetermined shear, illustrated by the displacement angle $\theta_2$, very much greater shearing displacement $\theta_1$ is obtained, FIG. 2, when the damping layer 3 of the damping tape 3—3' is spaced from the surface 1, as by the spacer means 5. Greater dissipation of energy thus takes place for the same damping tape, and hence a greater damping effect is produced.

Referring more particularly to FIG. 1, it will be observed that with the surface 1 in its static, non-flexed condition, corresponding points $A_1$ and $A_2$ on opposite sides of the constraining layer 3' will be aligned vertically with the corersponding points $A_3$ at the bottom of the damping layer 3, $A_4$ at the upper boundary of the surface-to-be-damped 1, $A_5$ at the neutral plane P of the surface 1, $A_6$ at the lower boundary of the surface 1. When, however, the surface 1 is flexed, as shown in FIG. 2, the rigidly coupled spacer means 5 will move so as to remain extending normal to the surface 1, retaining substantial alignment of the before-mentioned points $A_3$, $A_4$, $A_5$ and $A_6$, but along a direction at an angle to the vertical. The movement of the point $A_3$, however, has resulted in shearing the layer 3, since the bottom point $A_2$ of the constraining layer 3' will not have moved too far from its position $A_2$ in FIG. 1. The constraining layer 3', being substantially incapable of extending or compressing, except as later discussed, will slide laterally relative to the surface 1, substantially parallel thereto, shearing the damping layer 3 and, through such shear motion, dissipating the vibrational energy.

Figure 6:
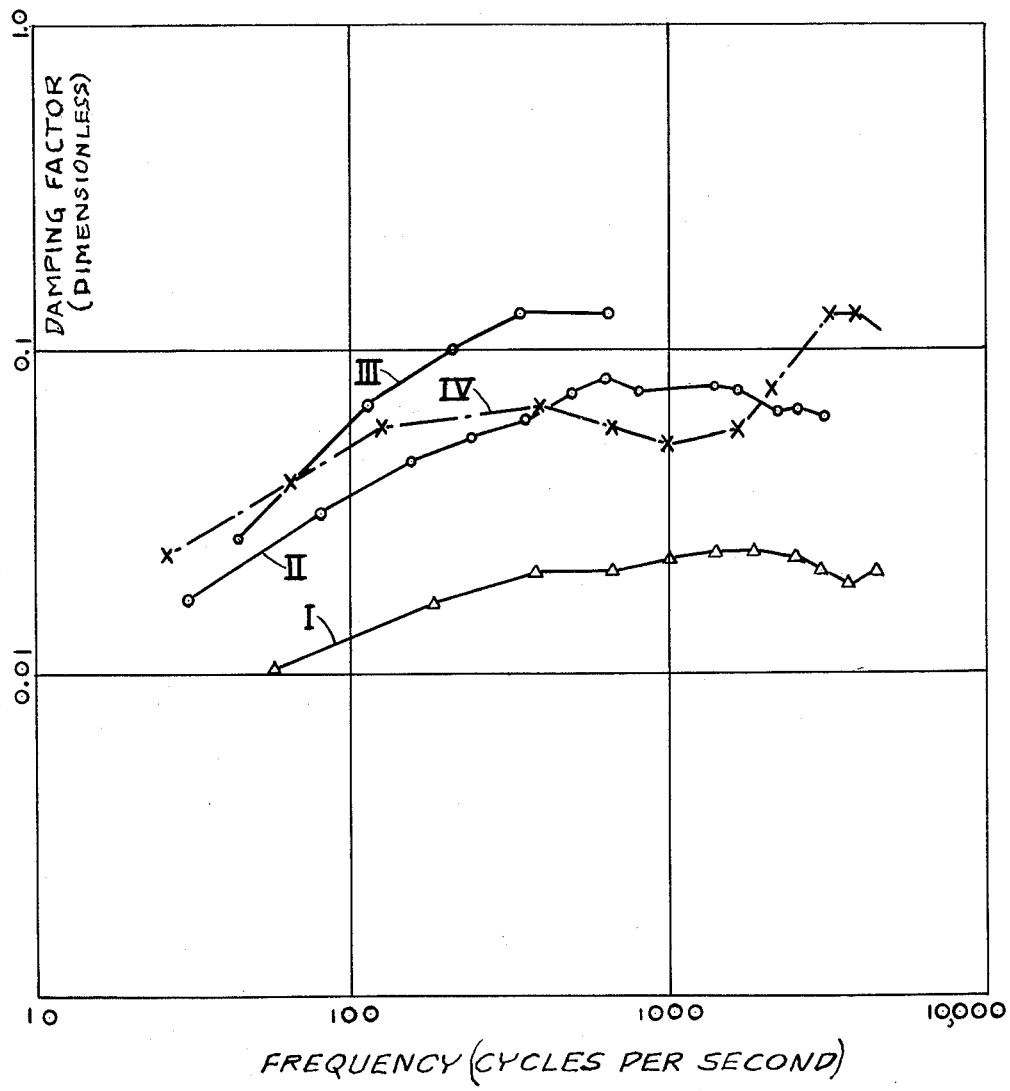
FIG. 6 is a graph illustrating experimentally obtained results that demonstrate the efficacy of the present invention.

Comparison of the angle $\theta_1$, formed by the line between points $A_2$ and $A_3$ and the vertical, in FIG. 2, with the corresponding angle $\theta_2$ resulting when the damping tape or the like is directly applied to the surface 1, FIG. 3, clearly demonstrates the amplification in the amount of shear displacement of the damping layer 3 that is attained in accordance with the present invention. Referring, for example, to FIG. 6, the lower-most curve I is an experimentally obtained graph illustrating the variation in damping factor, plotted along the ordinate, as a function of frequency, plotted in cycles per second along the abscissa. This performance was obtained for a surface 1 of one-eighth-inch thick aluminum plate, carrying two superimposed layers of the damping tape, applied as shown in FIG. 3, having aluminum foil constraining layers 3' and pressure-sensitive damping adhesive layers 3 each of the order of 0.003 inch thick. The particular tape was the type #435 manufactured by Minnesota Mining and Manufacturing Company. By employing the honeycomb spacers 5, in this case 5/16 inch thick and constituted of aluminum, the vastly improved damping factor performance of the uppermost curve III were obtained, demonstrating the vast improvement obtainable with the present invention. A balsa-wood spacer 5, one-eighth of an inch thick produced the improved performance of curve II for the same damping tape.

Since the important phenomenon is the amplified shearing of the damping layer 3, that layer need not be disposed in the particular location illustrated in FIGS. 1 and 2. In FIGS. 4 and 5, therefore, the parts are reversed such that the damping layer 3 has its lower surface intimately secured to the surface 1 that is to be damped, and its upper surface is adhered to the bottom of the spacer member 5. The spacer 5, in turn, is mechanically coupled rigidly to the constraining layer 3'. As is clear from FIG. 5, the amplified motion imparted to the constraining layer 3' through the rigid spacer members 5 serves to displace the point $A_3$, this time to the left of the point $A_4$, shearing the layer 3, as before.

Figure 7:
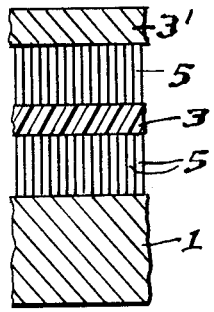
FIGS. 7 through 9 are views similar to FIG. 1 of further modifications.
Figure 8:
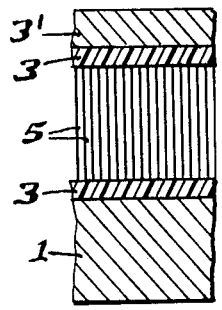
Figure 9:
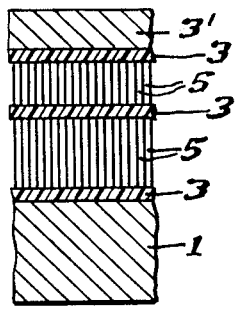

The combination of the damping layer and spacer 3—5 may assume other forms equivalent to the system of FIG. 1, provided that the shearing takes place principally in the damping layer 3 and that the spacer member 5 has a shear stiffness greater than that of the damping layer 3 and an extensional stiffness less than that of each of the surface 1 and the constraining surface 3'. The damping layer 3, of course, as explained in said co-pending application and as before stated herein, should have a complex shear modulus the magnitude of which is less than that of each of the said surface 1 and the constraining layer 3'. Thus, in FIG. 7, the damping layer-spacer structure is shown in the form of an intermediate damping layer 3 the opposite surfaces of which are rigidly mechanically sandwiched between upper and lower spacer elements 5 that, in turn, respectively rigidly connect with the constraining layer 3' and the upper boundary of the surface 1 to be damped. In FIG. 8, on the other hand, it is the spacer 5 that is provided at both ends with damping layers 3 which, in turn, are secured to the undersurface of the constraining layer 3' and the upper boundary of the surface 1. In the modification of FIG. 9, an intermediate damping layer 3 is interposed in the system of FIG. 8. Similarly, other configurations can be provided that meet the design limitations and restrictions, above explained.

Figure 10:
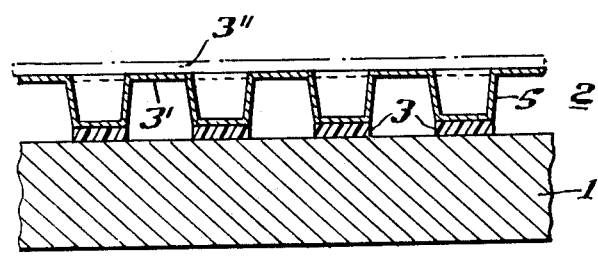
FIG. 10 is a similar view, upon a somewhat wider scale, of still an additional modification.

In FIG. 10, still a further modification is illustrated in which the spacer 5 is in the form of depressions of a waffle-like structure, such as a structure formed of vinyl plastic, reinforced plastic, formed metal or the like. The upper surface portion 3' of that structure serves as a shear-constraining or stiffening layer. An additional constraining layer or layers 3" may be added, as shown dotted, if desired. The bottom portions of the depressions 5 may be provided with the adhesive damping material 3 that is then secured to the surface 1 to be damped. The improved operation over conventional damping tape applications of such a waffle-like construction, molded from vinyl plastic and employed as a spacer with an upper layer of the before-mentioned damping tape #435, is plotted in the dash-dot graph IV in FIG. 6, the spacer 5 having an overall height of 0.175 inch.

The shearing of the damping layer 3 will generally result merely in the lateral displacement of the constraining layer 3', as illustrated in FIG. 2, provided the constraining layer 3' is substantially non-extensible. A point may be reached, however, as the shear stiffness of the damping layer 3 increases, where the damping layer, in shearing, will tend to stretch the constraining layer 3'. Some stretching of the constraining layer 3' can actually be used to advantage together with the shearing of the damping layer 3 for dissipating vibrational energy. The following relationship has been found to be useful in describing an optimum condition of stretchability of the constraining layer 3' and shear of the damping layer 3:

$$g = \frac{\lambda^2{}_B G_0}{4\pi^2 E_C H_C (H_D + H_S)} \qquad (1)$$

where $g$ is a shear parameter, $\lambda_B$ is the flexural wavelength, $G_0$ is the effective shear modulus of the damping layer 3, $E_C$ is the Young's modulus of the constraining layer 3', $H_C$ is the thickness of the constraining layer 3', and $H_D$ and $H_S$ are respectively the thicknesses of the damping layer 3 and the spacer means 5. The effective shear modulus $G_0$, in turn, is determined substantially by the following equation; where $\beta_D$ is the damping factor of layer 3, and $G_D$ and $G_S$ are respectively the shear moduli of the damping layer and the spacer means:

$$G_0 = \frac{(H_D+H_S)(1+\beta_D^2)G_D/H_D}{\left[1+(1+\beta_D^2)\frac{G_D/H_D}{G_S/H_S}\right]\left\{1+\frac{\beta_D^2}{\left[1+(1+\beta_D^2)\frac{G_D/H_D}{G_S/H_S}\right]^2}\right\}} \quad (2)$$

It has been found that $g$ should lie within the limits of less than substantially 1.0 and greater than substantially 0.5 in order to obtain the optimum compromise above discussed.

The functions of the spacer means and constraining layer or layers may also be combined as a unitary structure in other ways than by the waffle-like structure of FIG. 10. As a further illustration, an expanded foam-like plastic material 5—3', FIGS. 11 and 12, as of the "Styrofoam" type described in the said copending application, may be employed both as a spacer 5 (in view of its elastic resistance to shear deformation), thereby to provide amplified shearing of the adhesive or other damping layer 3, and as a constraining means 3' (in view of its simultaneous elastic resistance to elongation or compression). Multiple damping layers 3 and spacer-constraining members 5—3' are shown used in FIG. 12, it being understood that multiple damping tape and other structures may similarly be employed in all of the other embodiments of the invention represented in the other figures herein, for increasing the frequency range over which high damping is obtainable, or for other purposes.

Figure 11:
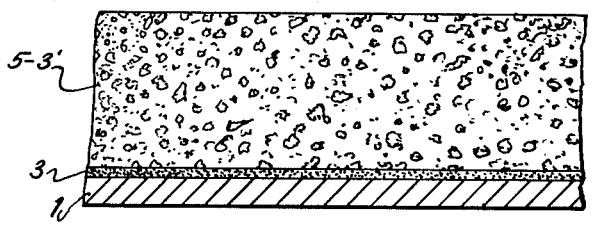
FIGS. 11 to 13 are sectional views of the other modified structures.
Figure 12:
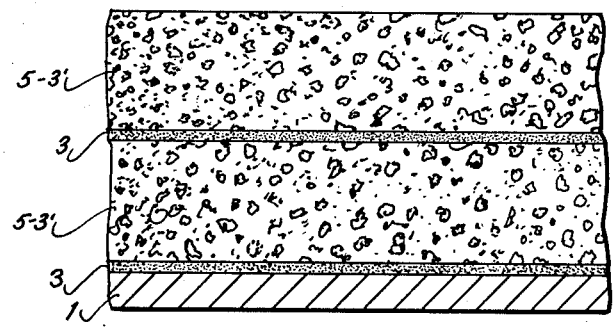
Figure 13:
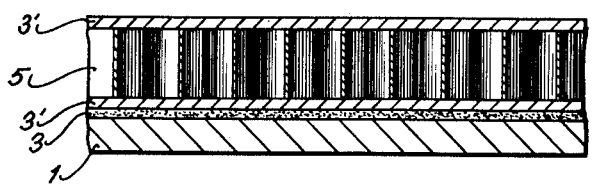

In order to be an effective spacer so as to provide shear-displacement amplification, the layers 5—3' of FIGS. 11 and 12, unlike mere constraining foils or panels of prior-art damping tapes and the like, should be very thick compared with the relatively thin damping layer. Similarly, a honeycomb-like cellular spacer structure 5 is shown in FIG. 13, sandwiched between and thus faced by constraining layers 3', the unit 3'—5—3' serving as a combined spacer and constraining member. Other kinds of combined spacing-and-constraining materials, including appropriate balsa or other wood or plastic materials or the like, discussed in the said copending application, may be employed.

Further modifications will occur to those skilled in the art and all such are considered to fall within the spirit and scope of the invention as defined in the appended claims.

What is claimed is:

1. In combination with a surface subject to flexural movements to be damped, a thin damping layer of mechanically extensible and constractable visco-elastic material arranged generally parallel to said surface, a mechanically stiff spacer much thicker than said layer arranged between and secured to said layer and said surface for coupling vibrations of said surface to said damping layer, and a relatively inextensible shear-constraining layer secured to said damping layer opposite said spacer and causing said damping layer to shear in response to said vibrations, the shear stiffness of said spacer being substantially greater than that of said damping layer, said damping layer having a complex shear modulus substantially less than the shear modulus of said surface and said constraining layer, and the extensional stiffness of said spacer being substantially less than that of said surface and said constraining layer, whereby the mechanical energy losses in said damping layer are substantially greater than obtainable in the absence of said stiff spacer.

2. In combination with a surface subject to flexural movements to be damped, a thin damping layer of mechanically extensible and contractable visco-elastic material having one side thereof secured to said surface, a mechanically stiff spacer much thickner than said layer secured to the other side of said damping layer, and a relatively inextensible shear-constraining layer secured to said spacer opposite said damping layer and causing said damping layer to shear in response to said movements, the shear stiffness of said spacer being substantially greater than that of said damping layer, said damping layer having a complex shear modulus substantially less than the shear modulus of said surface and said constraining layer, and the extensional stiffness of said spacer being substantially less than that of said surface and said constraining layer, whereby the mechanical energy losses in said damping layer are substantially greater than obtainable in the absence of said stiff spacer.

3. In combination with a surface subject to flexural movements to be damped, a thin damping layer of mechanically extensible and contractable visco-elastic material secured to a mechanically stiff spacer much thicker than said layer, and a relatively inextensible shear-constraining layer, said damping layer, said spacer, and said shear-constraining layer being arranged generally parallel to said surface with said damping layer and said spacer secured between said surface and said shear-constraining layer, said shear-constraining layer causing said damping layer to shear in response to said movements, the shear stiffness of said spacer being substantially greater than that of said damping layer, said lamping layer having a complex shear modulus substantially less than the shear modulus of said surface and said constraining layer, and the extensional stiffness of said spacer being substantially less than that of said surface and said constraining layer, whereby the mechanical energy losses in said damping layer are substantially greater than obtainable in the absence of said stiff spacer.

4. The invention of claim 3, wherein said spacer is a cellular member.

5. The invention of claim 3, wherein said spacer is a waffle member.

6. The invention of claim 3, wherein said spacer is a foam plastic member.

7. The invention of claim 3, wherein a shear parameter $g$ is determined substantially by the formula $$g = \frac{\lambda^2 B_2 G_0}{4\pi^2 E_c H_c (H_D+H_S)}$$

where $\lambda_B$ is the flexural wavelength, $E_c$ and $H_c$ are respectively the Young's modulus and thickness of the constraining layer, $H_D$ and $H_S$ are respectively the thicknesses of the damping layer and the spacer; $G_0$ is the effective shear modulus of the damping layer, determined substantially by the expression $$G_0 = \frac{(H_D+H_S)(1+\beta_D^2)G_D/H_D}{\left[1+(1+\beta_D^2)\frac{G_D/H_D}{G_S/H_S}\right]\left\{1+\frac{\beta_D^2}{\left[1+(1+\beta_D^2)\frac{G_D/H_D}{G_S/H_S}\right]^2}\right\}}$$

where $\beta_D$ is the damping factor of the damping layer and $G_D$ and $G_S$ are respectively the shear moduli of the damping layer and the spacer; and in which $g$ is limited substantially within the following limits:

$$0.5 < g < 1.0$$

8. The invention of claim 3, wherein said spacer and said constraining layer are unitary.

9. The invention of claim 3, wherein said spacer is adjacent said surface, and another mechanically stiff spacer secured between said damping layer and said constraining layer.

10. The invention of claim 3, wherein said damping layer is adjacent said surface, and another thin damping layer secured between said spacer and said constraining layer.

References Cited in the file of this patent

UNITED STATES PATENTS

| | | | |
|---|---|---|---|
| 2,609,413 | Leadbetter | Feb. 2, 1937 |
| 2,142,463 | Upson | Jan. 3, 1939 |
| 2,173,797 | Toohey et al. | Sept. 19, 1939 |
| 2,423,870 | Blessing | July 15, 1947 |
| 2,534,137 | Lewis | Dec. 12, 1950 |
| 2,644,777 | Havens | July 7, 1953 |
| 2,693,922 | Ellison | Nov. 9, 1954 |
| 2,744,042 | Pace | May 1, 1956 |
| 2,819,032 | Detrie et al. | Jan. 7, 1958 |